O. M. CRAYS.
MOTOR BUCK.
APPLICATION FILED MAR. 24, 1919.
1,344,385.
Patented June 22, 1920.
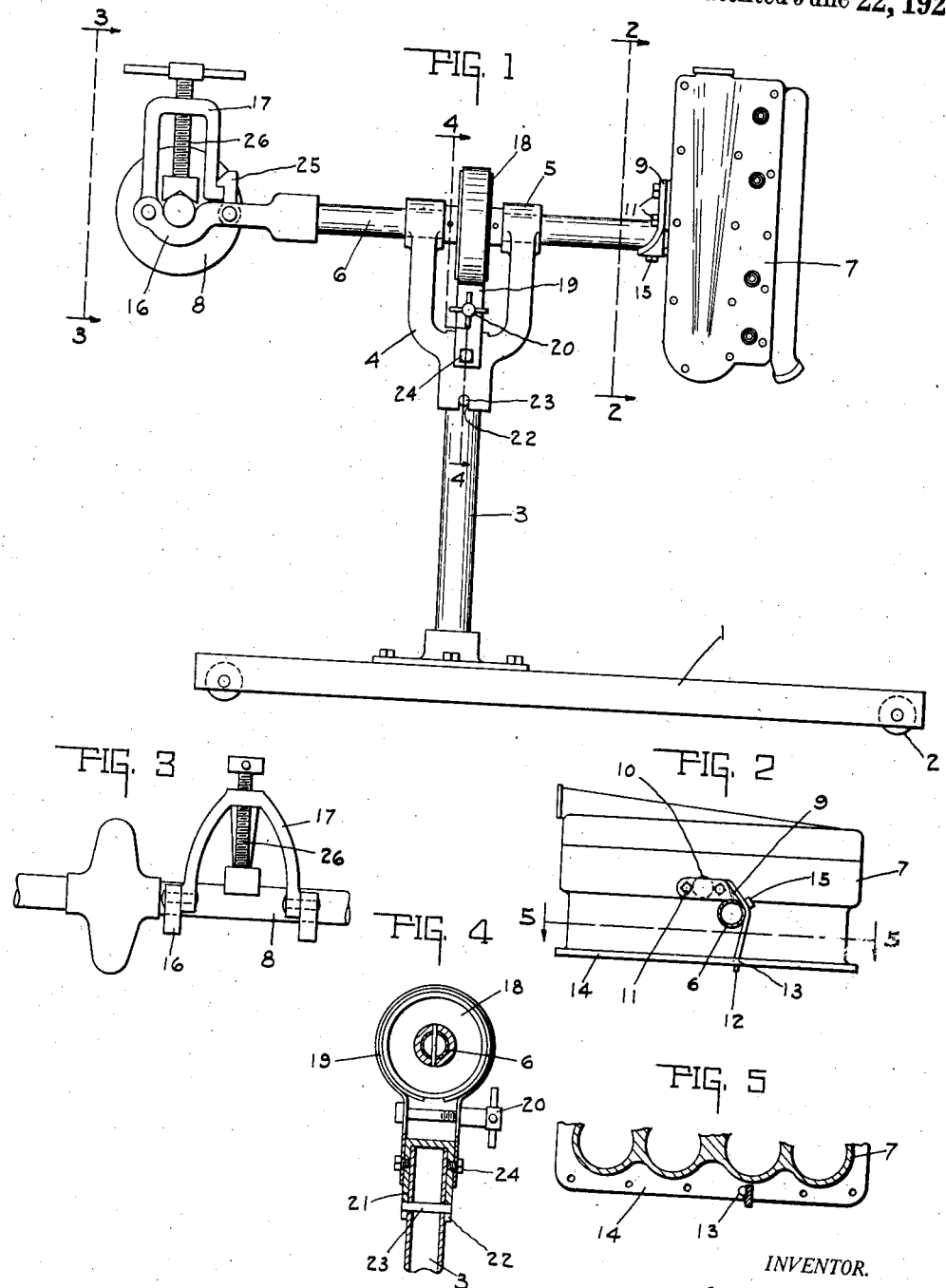
INVENTOR.
OSCAR M. CRAYS
BY
Lockwood & Lockwood
ATTORNEYS

UNITED STATES PATENT OFFICE.

OSCAR M. CRAYS, OF INDIANAPOLIS, INDIANA, ASSIGNOR OF ONE-THIRD TO RAYMOND BELLVILLE AND ONE-THIRD TO CLAUDE C. STONE, BOTH OF INDIANAPOLIS, INDIANA.

MOTOR-BUCK.

1,344,385.

Specification of Letters Patent. Patented June 22, 1920.

Application filed March 24, 1919. Serial No. 284,723.

*To all whom it may concern:*

Be it known that I, OSCAR M. CRAYS, a citizen of the United States, and a resident of Indianapolis, county of Marion, and State of Indiana, have invented a certain new and useful Motor-Buck; and I do hereby declare that the following is a full, clear, and exact description thereof, reference being had to the accompanying drawings, in which like numerals refer to like parts.

This invention relates to motor bucks, and is designed primarily for supporting the motor or other parts of an automobile while said parts are being repaired or assembled, although it will be understood that the buck may be used for various purposes.

One feature of the invention is the provision of a support and shaft which are mounted upon a movable base whereby the buck may be transported from place to place as convenience may require.

A further feature of the invention is the provision of means at one end of the shaft for attaching and supporting a motor of an automobile, particularly of the Ford type.

A further feature of the invention is the provision of means at the opposite end of the shaft for supporting the axle of an automobile, or any object having a round surface, and a further feature of the invention is the provision of a brake mechanism for holding the supporting shaft against rotation, whereby when the object being operated upon is turned to a preferred position it will be held in this position by the brake mechanism until such time as it is desired to further rotate the supporting shaft for turning other parts of the device into position to be operated upon.

Other objects and advantages will be more fully set forth in the accompanying specification.

In the accompanying drawings, which are made a part of this application, Figure 1 is an elevation of the motor buck showing a motor attached to one end thereof and an automobile axle to the opposite end thereof. Fig. 2 is a sectional view as seen on line 2—2 Fig. 1. Fig. 3 is an elevation as seen from line 3—3 Fig. 1. Fig. 4 is a sectional view as seen on line 4—4 Fig. 1 and Fig. 5 is a sectional view as seen on line 5—5 Fig. 2.

Referring to the drawings, in which similar reference numerals designate corresponding parts throughout the several views, 1 indicates a base which may be constructed in any preferred manner, and 2 indicates supporting wheels therefor so that said base may be moved to any convenient point.

Extending upwardly from the base 1 is a standard 3, to the upper end of which is attached a bifurcated yoke 4, the free ends of the arms of the yoke having bearings 5 thereon, through which extends a supporting shaft 6, preferably extending in a horizontal plane.

The shaft 6 is designed to support various objects while being repaired or worked upon, but in the present instance a motor 7 is shown attached to one end of the shaft 6 while an axle 8 is shown attached to the opposite end of the shaft. The motor herein shown is of the Ford type, and in order to readily attach the motor to the shaft and distribute the weight of the motor, a bracket 9 is provided, one end of which fits over the usual opening 10 in the motor, through which water passes into the motor, and is secured to the motor by bolts 11, while the opposite end of the bracket is extended downwardly and provided with a pintle 12 which passes through one of the bolt openings 13 in the base flange 14 of the motor. The bracket is then attached to the end of the shaft 6 in any suitable manner, as by entering a bolt or rivet 15 through the bracket and into the shaft. One end of the bracket 9 is so bent that one end will lie flat against the face of the motor while the remaining portion of the brake will lie flat against the supporting shaft 6.

A forked arm 16 is attached to the opposite end of the shaft 6, and pivoted to the forked arm is a clamp structure 17 which is designed for clamping and holding circular or cylindrical objects, and in this instance it is employed for clamping the axle 8 to the supporting shaft.

In working on the motor or the axle it is desired at times to bring said parts to a certain position by swinging them in the arc of a circle and then lock the parts in this position, and to this end a drum 18 is fixed to the shaft 6, preferably between the arms of the yoke 4, and surrounding said drum is a brake band 19, the ends of which project downwardly and are secured to the stem of the yoke 4. A clamping screw 20 is introduced through the depending portion of the brake band between the drum and the stem portion of the yoke, so that by tightening the clamp screw the brake band may be drawn tightly around the drum, thus holding the drum and shaft 6 against rotation, and by loosening the clamping screw, the shaft 6 and parts carried thereby, may be freely rotated to the proper position and then locked in this position by tightening the clamp screw.

The stem portion of the yoke 4 is provided with a socket 21 which slips over the end of the standard 3, the lower end of the socket having notches 22 which engage a pin 23 in the standard 3 and hold the yoke against rotation, and if desired the set screw 24, employed for securing the ends of the brake band to the yoke, may also be made of sufficient length to bind against the face of the standard 3, thus preventing casual removal of the yoke, or by loosening the set screws the yoke and shaft carried thereby may be readily disengaged from the standard.

In applying the device to use for handling the motor, the motor is released from the crank case and the water pipe disengaged therefrom, after which the bracket 9 is secured to the motor by introducing the pintle through one of the bolt holes of the flange of the motor and then introducing bolts through the opposite end of the bracket and into the threaded openings on opposite sides of the water opening 10.

When an axle or the like is attached to the opposite end of the supporting shaft 6, the clamp structure 17 is swung to open position, which is accomplished by hinging the clamped structure to the forked arm 16, and after the axle or other object is placed on to the forked arm, the clamping frame is swung to its closed position and is held in such position by means of a latch 25, or in any suitable manner. The clamp screw 26 is then lowered until the clamp engages the axle and forces the same against the forked arm thus securely holding the axle in engagement with the support. After the parts have been attached to the supporting shaft said parts may be readily rotated to any desired position, thus placing them in convenient position to be repaired or worked upon. These parts may also be held in convenient position while being torn down or assembled.

The invention claimed is:

1. A motor buck including a standard, a yoke on the standard, a horizontal supporting shaft carried by said yoke, and means to attach different objects to either or both ends of the supporting shaft.

2. A motor buck including a standard, a yoke removably attached to said standard, a horizontally disposed supporting shaft projecting from each side of the yoke, and means for attaching objects to the ends of the supporting shaft.

3. A motor buck including a standard, a yoke on said standard, a horizontally disposed supporting shaft rotatably mounted on said yoke, and a brake mechanism for controlling the rotation of said supporting shaft.

4. A motor buck including a standard, a supporting shaft rotatably mounted on said standard, a drum fixed to said shaft, a brake band carried by the standard and surrounding said drum, and means for tightening the brake band on the drum to hold said shaft against rotation.

5. A motor buck including a standard, a yoke mounted on the standard, a horizontally disposed shaft rotatably mounted on the yoke, a brake drum fixed to said shaft, a brake band surrounding said drum and having its ends secured to said yoke, and means for clamping the brake band around the drum for holding said shaft against rotation.

In witness whereof, I have hereunto affixed my signature.

OSCAR M. CRAYS.